US011192551B2

(12) United States Patent
Toen et al.

(10) Patent No.: US 11,192,551 B2
(45) Date of Patent: Dec. 7, 2021

(54) VEHICLE CONTROL DEVICE (71) Applicant: SUBARU CORPORATION, Tokyo (JP)

(72) Inventors: Kazuhiro Toen, Tokyo (JP); Yoshinobu Yamazaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/060,530

(22) Filed: Oct. 1, 2020

(65) Prior Publication Data
US 2021/0129846 A1 May 6, 2021

(30) Foreign Application Priority Data

Nov. 6, 2019 (JP) .............................. JP2019-201330

(51) Int. Cl.
B60W 30/18 (2012.01)
B60W 10/08 (2006.01)
(Continued)

(52) U.S. Cl.
CPC ...... B60W 30/18072 (2013.01); B60W 10/02 (2013.01); B60W 10/08 (2013.01);
(Continued)

(58) Field of Classification Search
CPC ...... B60W 10/02; B60W 10/06; B60W 10/08; B60W 30/18072; B60W 2030/1809; B60W 2710/022; B60W 2710/0644; F02N 11/04; F16D 25/14; F16D 2121/04; F16D 2125/023; F16D 2500/1026;
(Continued)

(56) References Cited

U.S. PATENT DOCUMENTS 9,834,193 B2 * 12/2017 Komuro ................. B60K 6/387
2015/0166053 A1 * 6/2015 Kamijo ............. B60W 30/1884
701/22

(Continued)

FOREIGN PATENT DOCUMENTS

JP 3513072 B2 3/2004
JP 3948147 B2 7/2007
(Continued)

Primary Examiner — Edwin A Young
(74) Attorney, Agent, or Firm — McGinn IP Law Group, PLLC (57) ABSTRACT A vehicle control device applicable to a vehicle including an engine includes an electric motor coupled to the engine, a hydraulic clutch, a solenoid control valve, a first travel control unit, a second travel control unit, and a fail-safe control unit. The hydraulic clutch is engaged when hydraulic oil is supplied and disengaged when the hydraulic oil is discharged. The solenoid control valve includes a solenoid. The solenoid control valve supplies the hydraulic oil to the hydraulic clutch when the solenoid is in a non-energized state, and discharges the hydraulic oil when the solenoid is in the energized state. The first travel control unit executes an engine traveling mode, and the second travel control unit executes an inertial traveling mode. The fail-safe control unit drives the electric motor when the solenoid is switched from the energized state to the non-energized state while the inertial traveling mode is executed.

9 Claims, 6 Drawing Sheets (51) Int. Cl.
  *B60W 10/02* (2006.01)
  *F02N 11/04* (2006.01)
  *F16D 48/02* (2006.01)
  *B60K 17/06* (2006.01)
  *F16D 121/04* (2012.01)
  *F16D 125/02* (2012.01)

(52) U.S. Cl.
  CPC .............. *F02N 11/04* (2013.01); *F16D 25/14* (2013.01); *B60K 17/06* (2013.01); *B60W 2030/1809* (2013.01); *B60W 2710/022* (2013.01); *B60W 2710/0644* (2013.01); *B60Y 2300/425* (2013.01); *B60Y 2300/43* (2013.01); *B60Y 2300/63* (2013.01); *B60Y 2400/406* (2013.01); *F16D 2121/04* (2013.01); *F16D 2125/023* (2013.01); *F16D 2500/106* (2013.01); *F16D 2500/1026* (2013.01); *F16D 2500/10412* (2013.01); *F16D 2500/1107* (2013.01); *F16D 2500/302* (2013.01); *F16D 2500/5085* (2013.01); *F16D 2500/50227* (2013.01); *F16D 2500/5114* (2013.01)

(58) Field of Classification Search
  CPC ..... F16D 2500/10412; F16D 2500/106; F16D 2500/1107; F16D 2500/302; F16D 2500/50227; F16D 2500/5085; F16D 2500/5114; B60Y 2300/425; B60Y 2300/43; B60Y 2300/63; B60Y 2400/406
  See application file for complete search history.

(56) References Cited

U.S. PATENT DOCUMENTS

| | | | |
|---|---|---|---|
| 2015/0314777 A1* | 11/2015 | Koike | ................ F02N 11/04 701/22 |
| 2016/0207524 A1* | 7/2016 | Miyaishi | ......... B60W 30/18018 |
| 2016/0297292 A1 | 10/2016 | Sato et al. | |
| 2018/0236995 A1* | 8/2018 | Iwamoto | ............... B60W 10/02 |

FOREIGN PATENT DOCUMENTS

| JP | 2016-199157 A | 12/2016 |
|---|---|---|
| JP | 6457912 B2 | 1/2019 |

* cited by examiner

VEHICLE CONTROL DEVICE

CROSS-REFERENCE TO RELATED APPLICATIONS

The present application claims priority from Japanese Patent Application No. 2019-201330 filed on Nov. 6, 2019, the entire contents of which are hereby incorporated by reference.

BACKGROUND

The disclosure relates to a vehicle control device applicable to a vehicle including an engine.

A vehicle, such as an automobile, includes an engine as a power source. A clutch, such as a hydraulic clutch, is provided between the engine and a driving system (see Japanese Unexamined Patent Application Publication No. 2016-199157, Japanese Patent No. 6457912, Japanese Patent No. 3948147, and Japanese Patent No. 3513072).

SUMMARY

An aspect of the disclosure provides a vehicle control device that is applicable to a vehicle including an engine. The vehicle control device includes an electric motor, a hydraulic clutch, a solenoid control valve, a first travel control unit, a second travel control unit, and a fail-safe control unit. The electric motor is configured to be coupled to the engine. The hydraulic clutch is configured to be disposed on a power transmission path between the engine and a wheel. The hydraulic clutch is configured to be set to an engaged state when hydraulic oil is supplied and to a disengaged state when the hydraulic oil is discharged. The solenoid control valve includes a solenoid configured to be set to an energized state and a non-energized state. The solenoid control valve is configured to supply the hydraulic oil to the hydraulic clutch when the solenoid is in the non-energized state, and discharge the hydraulic oil from the hydraulic clutch when the solenoid is in the energized state. The first travel control unit is configured to execute an engine traveling mode in which the engine is set to a running state, the hydraulic clutch is set to the engaged state, and engine power is transmitted to the wheel. The second travel control unit is configured to execute an inertial traveling mode in which the engine is set to a stopped state, the hydraulic clutch is set to the disengaged state, and the vehicle is moved by inertia. The fail-safe control unit is configured to drive the electric motor to increase an engine speed when, in a state in which the inertial traveling mode is executed, the solenoid is switched from the energized state to the non-energized state.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Traveling modes of a vehicle include an inertial traveling mode in which a hydraulic clutch is disengaged to disconnect an engine from a driving system so that the vehicle is moved by inertia. When the inertial traveling mode is executed, the engine is disconnected from the driving system, so that the traveling resistance is reduced. Therefore, the energy efficiency of the vehicle can be improved, and fuel efficiency can be improved accordingly.

However, when abnormal energization, such as disconnection, of a solenoid control valve that controls the hydraulic clutch occurs in the inertial traveling mode in which the hydraulic clutch is disengaged, there is a risk that the hydraulic clutch will become engaged. The engagement of the hydraulic clutch in the inertial traveling mode may generate a large engagement shock that causes discomfort to an occupant.

Accordingly, it is desirable to reduce the engagement shock of the hydraulic clutch when the hydraulic clutch is engaged in the inertial traveling mode.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Power Train

Figure 1:
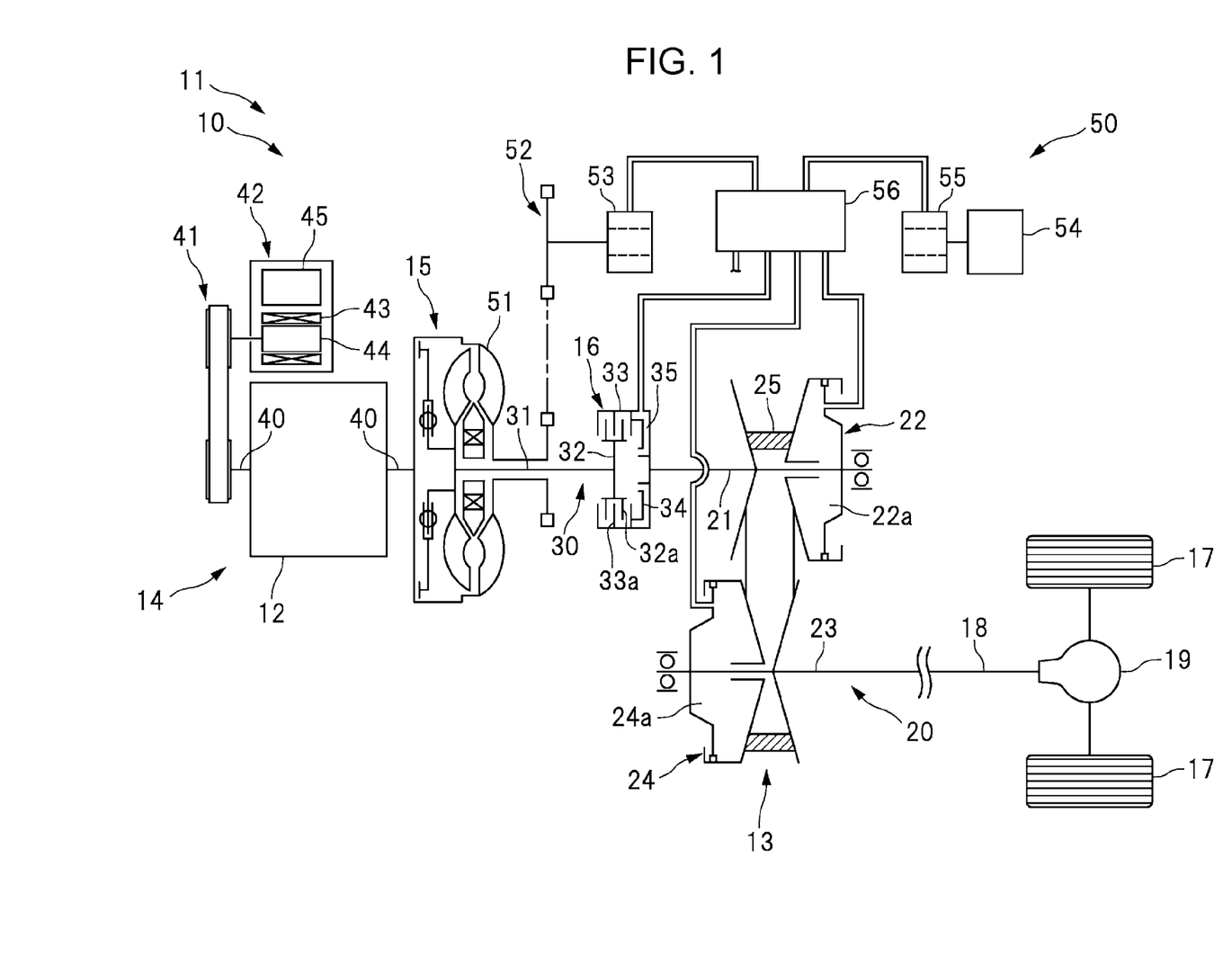
FIG. 1 illustrates a vehicle to which a vehicle control device according to an embodiment of the disclosure is applied.

FIG. 1 illustrates a vehicle 11 to which a vehicle control device 10 according to the embodiment of the disclosure is applied. As illustrated in FIG. 1, a power train 14 including an engine 12 and a continuously variable transmission 13 is mounted in the vehicle 11. A torque converter 15 and a forward clutch 16 are provided between the engine 12 and the continuously variable transmission 13. An output shaft 18 and a differential mechanism 19 are provided between the continuously variable transmission 13 and wheels 17. Engine power output by the engine 12 is transmitted to the continuously variable transmission 13 through the torque converter 15 and the forward clutch 16, and then is transmitted from the continuously variable transmission 13 to the wheels 17 through the differential mechanism 19 and other components. The vehicle control device 10 according to the embodiment of the disclosure includes components of the power train 14 in addition to control units of a main controller 81, which will be described below.

Continuously Variable Transmission

The continuously variable transmission 13 is provided on a power transmission path 20 between the forward clutch 16 and the wheels 17. The continuously variable transmission 13 includes a primary pulley 22 provided on a primary shaft 21 and a secondary pulley 24 provided on a secondary shaft 23. A primary oil chamber 22a is defined in the primary pulley 22, and a secondary oil chamber 24a is defined in the secondary pulley 24. A driving chain 25, which transmits power between the primary pulley 22 and the secondary pulley 24, is wrapped around the primary pulley 22 and the secondary pulley 24. The continuously variable transmission 13 is configured such that wrapping diameters of the driving chain 25 can be changed by adjusting the oil pressures in the primary oil chamber 22a and the secondary oil chamber 24a, thereby enabling continuous variation of the gear ratio between the primary shaft 21 and the secondary shaft 23.

Forward Clutch

The forward clutch 16 is provided on a power transmission path 30 between the engine 12 and the wheels 17. In one embodiment, the forward clutch 16 may serve as a "hydraulic clutch". The forward clutch 16 includes a clutch hub 32 coupled to a turbine shaft 31 of the torque converter 15 and a clutch drum 33 coupled to the primary shaft 21. A friction plate 32a is attached to the clutch hub 32, and a friction plate 33a that faces the friction plate 32a is attached to the clutch drum 33. A piston 34 is disposed in the clutch drum 33, and an engagement oil chamber 35 is defined between the clutch drum 33 and the piston 34. The forward clutch 16 can be set to an engaged state by supplying hydraulic oil to the engagement oil chamber 35 to increase the oil pressure so that the piston 34 is moved forward and that the friction plates 32a and 33a engage with each other. The forward clutch 16 can be set to a disengaged state by discharging the hydraulic oil from the engagement oil chamber 35 to reduce the oil pressure so that the piston 34 is moved backward and that the friction plates 32a and 33a are disengaged from each other. Thus, the forward clutch 16 is set to the engaged state when the hydraulic oil is supplied to the engagement oil chamber 35, and is set to the disengaged state when the hydraulic oil is discharged from the engagement oil chamber 35. The forward clutch 16 can be set to a slipping state by adjusting the oil pressure in the engagement oil chamber 35. Thus, the engagement force of the forward clutch 16 can be freely adjusted.

Starter-Generator

A starter-generator 42 is coupled to a crank shaft 40 of the engine 12 by a belt mechanism 41. In one embodiment, the starter-generator 42 may serve as either one of an "electric motor" and a "motor-generator". The starter-generator 42 is an integrated starter generator (ISG) that functions as a generator and a motor. The starter-generator 42 functions not only as a generator that is driven by the crank shaft 40 to generate electric power but also as a motor that drives the crank shaft 40 when, for example, the engine is started. The starter-generator 42 includes a stator 43 including a stator coil and a rotor 44 including a field coil. The starter-generator 42 also includes an ISG controller 45 including an inverter, a regulator, a microcomputer, and various sensors to control energization states of the stator coil and the field coil. An electric power generation voltage, an electric power generation torque, a powering torque, etc., of the starter-generator 42 can be controlled by controlling the energization states of the field coil and the stator coil with the ISG controller 45.

Traveling Modes

Figure 2A:
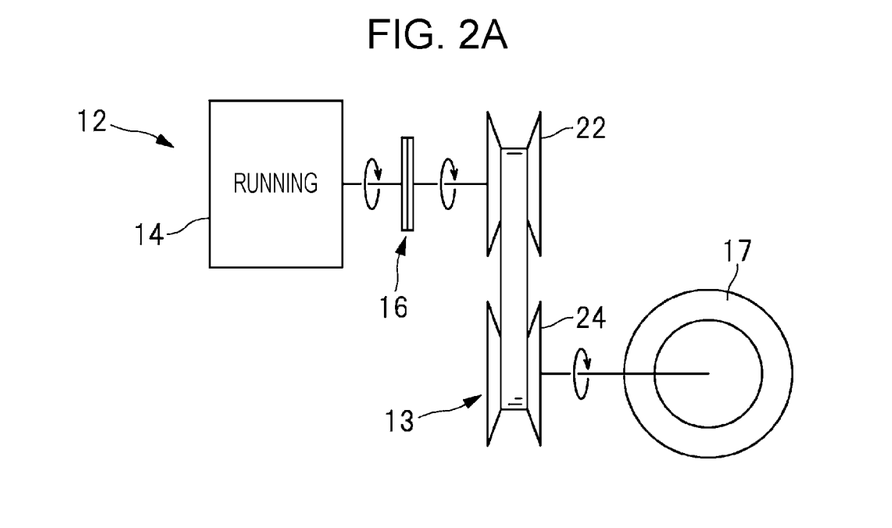
FIG. 2A and FIG. 2B illustrate operational states of a power train in different traveling modes.
Figure 2B:
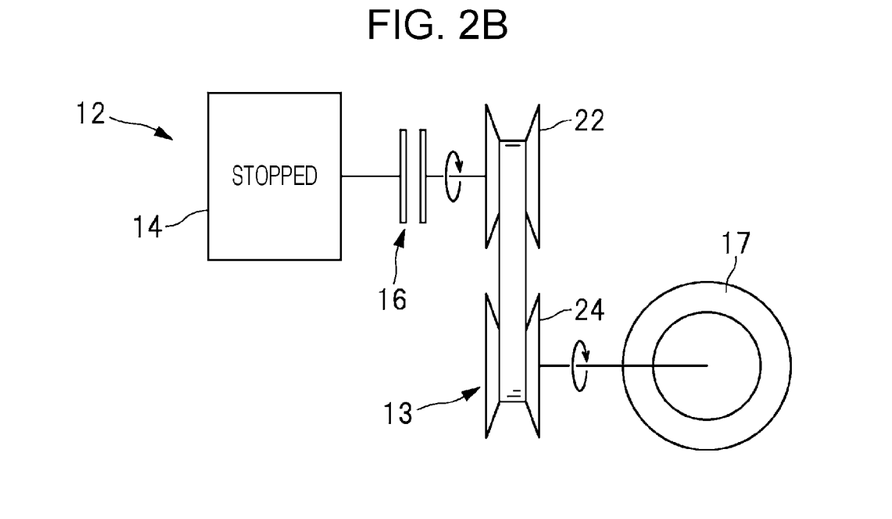

FIG. 2A and FIG. 2B illustrate operational states of the power train 14 in different traveling modes. The illustrated vehicle 11 has an engine traveling mode and a sailing traveling mode as traveling modes thereof. In one embodiment, the sailing traveling mode may serve as an "inertial traveling mode". In the engine traveling mode, the vehicle 11 is moved by engine power. In the sailing traveling mode, the engine 12 is stopped and the vehicle 11 is moved by inertia. FIG. 2A illustrates the operational state of the power train 14 when the engine traveling mode is executed. FIG. 2B illustrates the operational state of the power train 14 when the sailing traveling mode is executed.

As illustrated in FIG. 2A, when the engine traveling mode is executed, the engine 12 is set to a running state and the forward clutch 16 is set to the engaged state. Thus, in the engine traveling mode, the forward clutch 16 is engaged so that the engine 12 can be coupled to the wheels 17 and that the vehicle 11 can be moved by the engine power.

As illustrated in FIG. 2B, when the sailing traveling mode is executed, the engine 12 is set to a stopped state and the forward clutch 16 is set to the disengaged state while the vehicle is traveling. Thus, in the sailing traveling mode, the forward clutch 16 is disengaged to disconnect the engine 12 from the wheels 17 and reduce the traveling resistance, so that the vehicle 11 can be moved by inertia. When the sailing traveling mode is executed, the vehicle 11 can be moved by effectively utilizing the kinetic energy.

As described below, sailing conditions under which the sailing traveling mode is executed are set so that a traveling mode can be selected based on the traveling state. The sailing traveling mode is executed when the sailing conditions are met, and the engine traveling mode is executed when the sailing conditions are not met.

Hydraulic System

The power train 14 is provided with a hydraulic system 50 that supplies hydraulic oil to, for example, the continuously variable transmission 13 and the forward clutch 16. The hydraulic system 50 includes a mechanical pump 53 coupled to a housing 51 of the torque converter 15 by a chain mechanism 52 and an electric pump 55 coupled to a pump motor 54. The hydraulic system 50 also includes a valve body 56 including a plurality of solenoid valves and oil passages. In the engine traveling mode, in which the engine 12 is activated, the mechanical pump 53 is driven by the engine 12 so that the hydraulic oil is supplied from the mechanical pump 53 to the valve body 56. In the sailing traveling mode, in which the engine 12 is stopped, the electric pump 55 is driven by the pump motor 54 so that the hydraulic oil is supplied from the electric pump 55 to the valve body 56. Thus, the electric pump 55 is an oil pump that supplies the hydraulic oil to the valve body 56 when the engine 12 is stopped.

Figure 3:
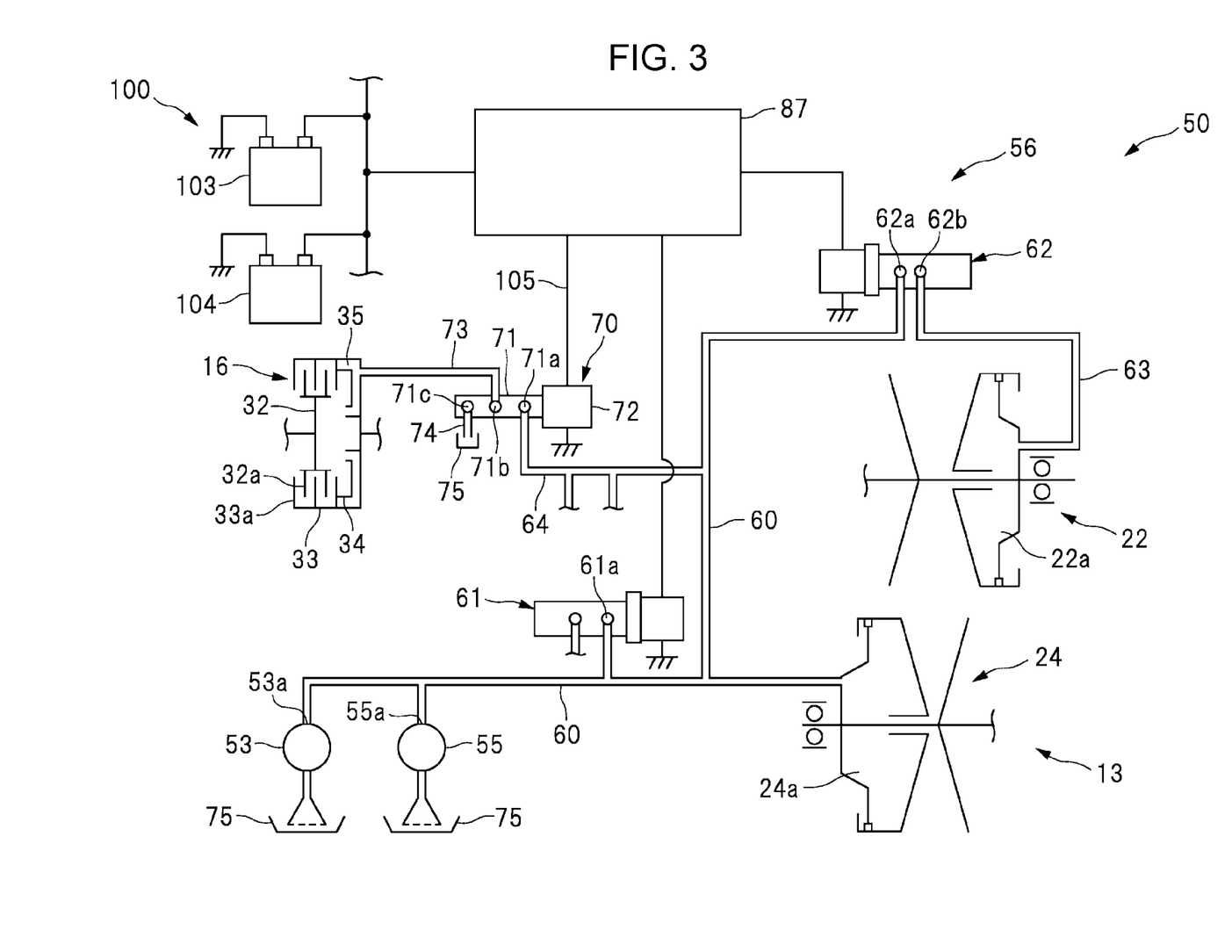
FIG. 3 illustrates a part of a hydraulic circuit of a valve body.

FIG. 3 illustrates a part of a hydraulic circuit of the valve body 56. As illustrated in FIG. 3, a secondary pressure passage 60 is coupled to discharge ports 53a and 55a of the mechanical pump 53 and the electric pump 55. The secondary oil chamber 24a of the secondary pulley 24 and a pressure adjusting port 61a of a secondary pressure control valve 61 are coupled to the secondary pressure passage 60. The secondary pressure control valve 61 adjusts a secondary pressure supplied to the secondary oil chamber 24a based on, for example, a target transmission torque and a target gear ratio of the continuously variable transmission 13. The secondary pressure passage 60 is also coupled to an input port 62a of a primary pressure control valve 62, and a primary pressure passage 63 that extends from an output port 62b of the primary pressure control valve 62 is coupled to the primary oil chamber 22a of the primary pulley 22. The primary pressure control valve 62 adjusts a primary pressure supplied to the primary oil chamber 22a based on, for example, the target gear ratio of the continuously variable transmission 13 and the secondary pressure.

A branch oil passage 64, which branches from the secondary pressure passage 60, is coupled to a clutch pressure control valve 70, which supplies hydraulic oil to the forward clutch 16 in a controlled manner. In one embodiment, the clutch pressure control valve 70 may serve as a "solenoid control valve". The clutch pressure control valve 70 includes a valve body 71 that contains a spool valve shaft (not illustrated) and a solenoid 72 that moves the spool valve shaft contained in the valve body 71 in an axial direction. The valve body 71 of the clutch pressure control valve 70 has an input port 71a to which the branch oil passage 64 is coupled, an output port 71b to which a clutch oil passage 73 is coupled, and a discharge port 71c to which a discharge oil passage 74 is coupled. The clutch oil passage 73 is coupled to the engagement oil chamber 35 of the forward clutch 16, and the discharge oil passage 74 opens toward an oil pan 75 disposed therebelow.

The clutch pressure control valve 70, which supplies the hydraulic oil to the forward clutch 16, is a normally open solenoid control valve through which the input port 71a and the output port 71b communicate with each other when the solenoid 72 is not energized. When the solenoid 72 is not energized, the spool valve shaft moves to one side in the axial direction so that the input port 71a and the output port 71b of the valve body 71 communicate with each other. When the clutch pressure control valve 70 is set to this oil supplying state, the hydraulic oil can be guided from the input port 71a to the output port 71b. Therefore, the hydraulic oil can be supplied from the branch oil passage 64 to the engagement oil chamber 35 through the clutch oil passage 73, and the forward clutch 16 can be set to the engaged state.

When the solenoid 72 is energized, the spool valve shaft moves to the other side in the axial direction so that the input port 71a of the valve body 71 is blocked and that the output port 71b and the discharge port 71c communicate with each other. When the clutch pressure control valve 70 is set to this oil discharging state, the hydraulic oil can be guided from the output port 71b to the discharge port 71c. Therefore, the hydraulic oil can be discharged from the engagement oil chamber 35 to the discharge oil passage 74 through the clutch oil passage 73, and the forward clutch 16 can be set to the disengaged state. The spool valve shaft can be stopped at any position by controlling the amount of energization of the solenoid 72. Therefore, the oil pressure of the engagement oil chamber 35 of the forward clutch 16 can be freely adjusted, and the forward clutch 16 can be set to the slipping state.

Control System

Figure 4:
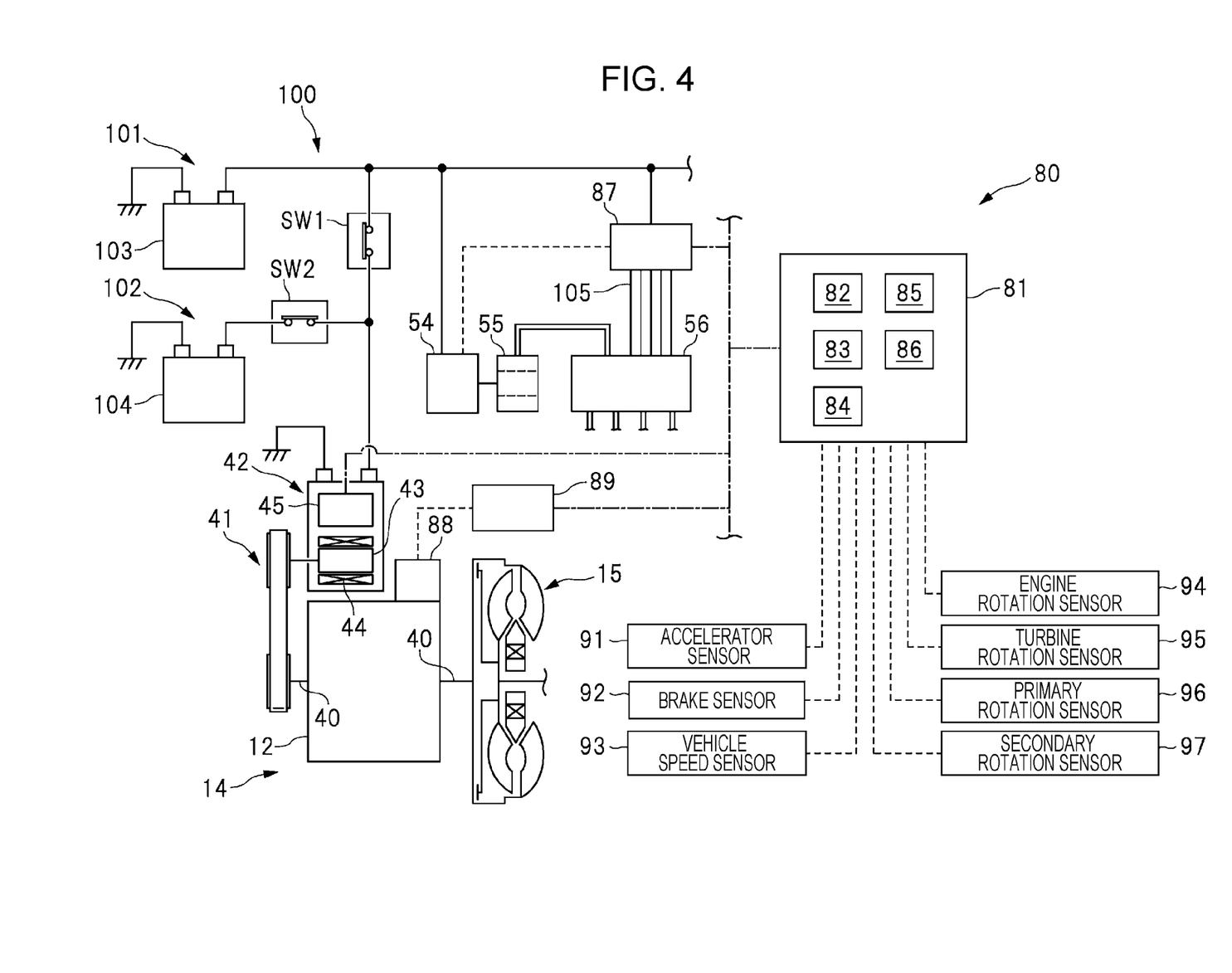
FIG. 4 illustrates a part of a control system of the power train.

A control system 80 of the power train 14 will now be described. FIG. 4 illustrates a part of the control system 80 of the power train 14. In FIG. 4, components similar to those illustrated in FIG. 1 and FIG. 3 are denoted by the same reference symbols, and description thereof is omitted.

As illustrated in FIG. 4, the control system 80 of the power train 14 includes a main controller 81 composed of, for example, a microcomputer. The main controller 81 includes a first travel control unit 82 that executes the engine traveling mode, a second travel control unit 83 that executes the sailing traveling mode, and a traveling mode selector 84 that selects a traveling mode based on the traveling state. The main controller 81 also includes an abnormality detector 85 that detects abnormal energization of the clutch pressure control valve 70 and a fail-safe control unit 86 that controls the starter-generator 42 when abnormal energization of the clutch pressure control valve 70 occurs. The control system 80 of the power train 14 also includes a transmission controller 87 that is composed of, for example, a microcomputer and controls, for example, the valve body 56 and the electric pump 55. The control system 80 of the power train 14 also includes an engine controller 89 that is composed of, for example, a microcomputer and controls engine accessories 88, such as a throttle valve and an injector.

The main controller 81 and the various controllers 45, 87, and 89 are coupled to each other to enable communication therebetween through an onboard network, such as a CAN. The main controller 81 controls operating elements of the power train 14 based on information obtained by the various controllers and sensors. The sensors coupled to the main controller 81 include an accelerator sensor 91 that detects an operating state of an accelerator pedal, a brake sensor 92 that detects an operating state of a brake pedal, and a vehicle speed sensor 93 that detects the speed of the vehicle 11. The sensors coupled to the main controller 81 also include an engine rotation sensor 94 that detects the rotational speed of the engine 12, a turbine rotation sensor 95 that detects the rotational speed of the turbine shaft 31, a primary rotation sensor 96 that detects the rotational speed of the primary shaft 21, and the secondary rotation sensor 97 that detects the rotational speed of the secondary shaft 23.

When the above-described engine traveling mode is executed, the first travel control unit 82 of the main controller 81 sets the engine 12 to the running state through the engine controller 89 and sets the forward clutch 16 to the engaged state through the transmission controller 87 and the valve body 56. When the above-described sailing traveling mode is executed, the second travel control unit 83 of the main controller 81 sets the engine 12 to the stopped state through the engine controller 89 and sets the forward clutch 16 to the disengaged state through the transmission controller 87 and the valve body 56. In addition, the main controller 81 controls the starter-generator 42 through the ISG controller 45 and controls the electric pump 55 through the transmission controller 87.

The control system 80 of the power train 14 is provided with a power supply circuit 100 that supplies electric power to the various actuators and controllers. The power supply circuit 100 includes a first power supply system 101 and a second power supply system 102 that are coupled in parallel to each other with a switch SW1 provided therebetween.

The first power supply system 101 includes a first storage capacitor 103 that is, for example, a lead battery, and electrical loads, such as the pump motor 54 and the main controller 81, which are coupled to the first storage capacitor 103. The second power supply system 102 includes a second storage capacitor 104 that is, for example, a lithium ion battery, and the starter-generator 42 coupled to the second storage capacitor 104. A switch SW2 is provided between the second storage capacitor 104 and the starter-generator 42. The switches SW1 and SW2 can be controlled by the main controller 81.

Sailing Traveling Mode

The sailing traveling mode will now be described. As described above, the sailing traveling mode is a traveling mode in which the vehicle 11 is moved by inertia. The sailing traveling mode is executed when acceleration of the vehicle 11 is not intended. The sailing conditions under which the sailing traveling mode is started are, for example, that the vehicle 11 is traveling in the engine traveling mode at a speed higher than a predetermined speed, and that the accelerator pedal is released. The sailing conditions may further include conditions that, for example, the vehicle 11 is not traveling along an uphill road and is under cruise control.

The traveling mode selector 84 of the main controller 81 determines to switch from the engine traveling mode to the sailing traveling mode when the vehicle 11 is traveling in the engine traveling mode at a speed higher than the predetermined speed and when the accelerator pedal is released. When it is determined that switching to the sailing traveling mode is to be performed, the second travel control unit 83 of the main controller 81 sets the engine 12 to the stopped state by outputting a control signal to the engine controller 89, and sets the forward clutch 16 to the disengaged state by outputting a control signal to the transmission controller 87. As described above, to set the forward clutch 16 to the disengaged state, the transmission controller 87 energizes the solenoid 72 through a conduction line 105 so that the hydraulic oil is discharged from the engagement oil chamber 35 of the forward clutch 16 through the clutch pressure control valve 70. That is, in the sailing traveling mode, the solenoid 72 of the clutch pressure control valve 70 is continuously energized by the transmission controller 87.

Fail-Safe Control

The fail-safe control in the sailing traveling mode will now be described. As described above, the solenoid 72 of the clutch pressure control valve 70 is continuously energized while the sailing traveling mode is being executed. If, for example, disconnection of the conduction line 105 coupled to the solenoid 72 occurs while the sailing traveling mode is being executed, the solenoid 72 of the clutch pressure control valve 70 is switched from the energized state to the non-energized state. In this case, the clutch pressure control valve 70 is switched from the oil discharging state to the oil supplying state, and the forward clutch 16 is switched from the disengaged state to the engaged state. Since the engine 12 is stopped in the sailing traveling mode, the forward clutch 16 is switched to the engaged state while the difference in rotational speed across the forward clutch 16 is large. When the forward clutch 16 is engaged in this manner, there is a risk that a large engagement shock will be generated.

To reduce the engagement shock of the forward clutch 16, the main controller 81 is provided with the abnormality detector 85 and the fail-safe control unit 86. The abnormality detector 85 of the main controller 81 monitors the energization state of the solenoid 72 of the clutch pressure control valve 70. The abnormality detector 85 is capable of determining whether the solenoid 72 is energized, that is, whether the solenoid 72 is in the energized state based on the current, potential, etc., of the solenoid 72. When the abnormality detector 85 detects that the solenoid 72 has been switched to the non-energized state, the fail-safe control unit 86 sets the starter-generator 42 to the powering state. By driving the starter-generator 42 as a motor and increasing the engine speed, the difference in rotational speed across the forward clutch 16 (hereinafter referred to as a rotational speed difference across the clutch) can be reduced before the forward clutch 16 is completely engaged as a result of, for example, disconnection of the conduction line 105. Thus, the engagement shock of the forward clutch 16 can be reduced.

Figure 5:
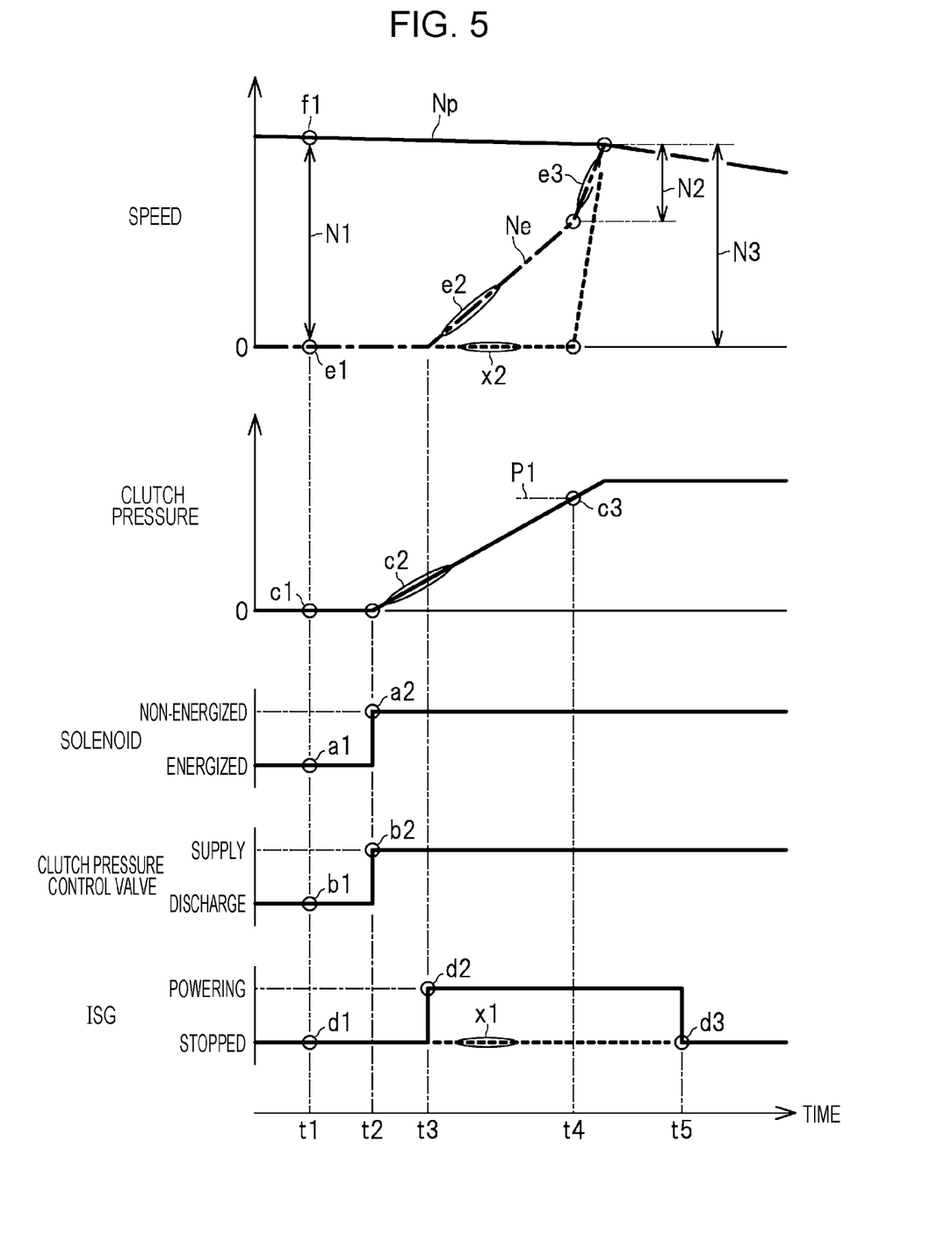
FIG. 5 is a timing chart illustrating the manner in which fail-safe control is executed in a sailing traveling mode.
Figure 6:
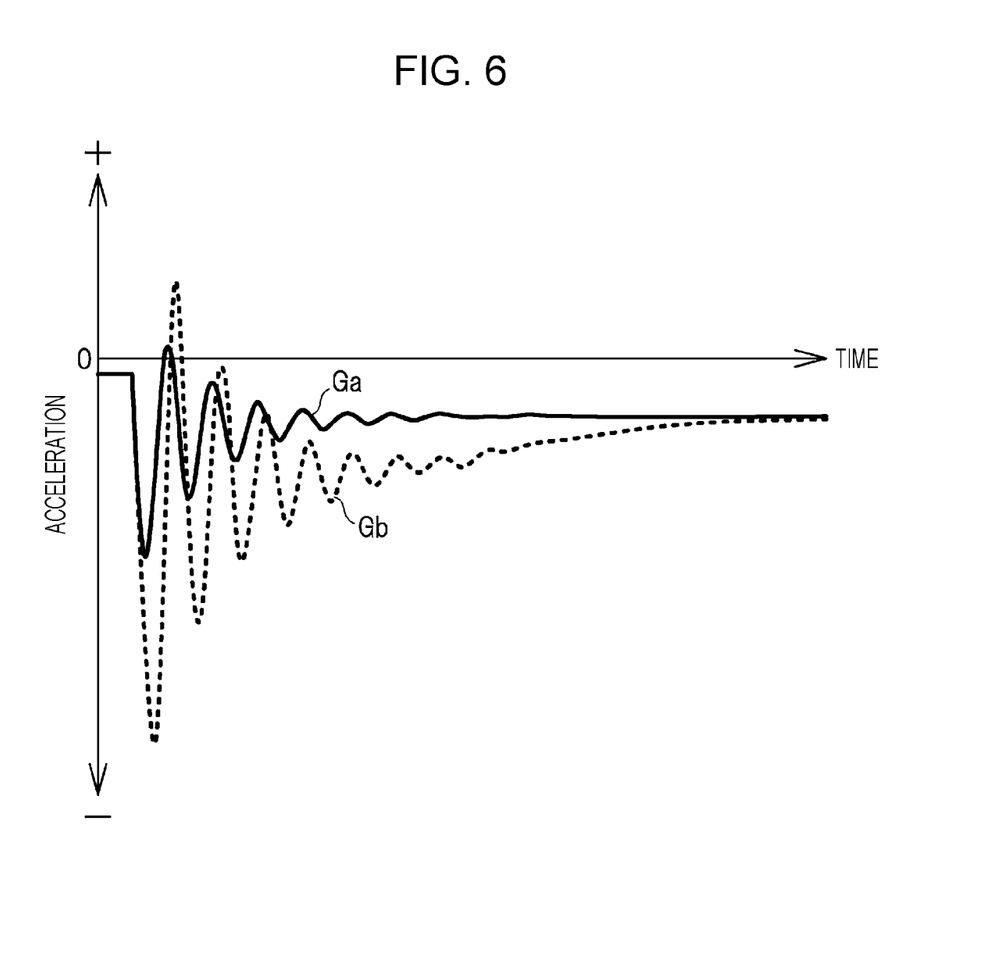
FIG. 6 is a graph illustrating the variations in vehicle acceleration with and without fail-safe control.

FIG. 5 is a timing chart illustrating the manner in which the fail-safe control is executed in the sailing traveling mode, and FIG. 6 is a graph illustrating the variations in the vehicle acceleration with and without the fail-safe control. In FIG. 5, the oil pressure in the engagement oil chamber 35 of the forward clutch 16 is referred to as "clutch pressure", and the starter-generator 42 is referred to as "ISG".

Referring to time t1 in FIG. 5, in the sailing traveling mode, the solenoid 72 is set to the energized state (symbol a1), and therefore the clutch pressure control valve 70 is set to the oil discharging state (symbol b1). Accordingly, the hydraulic oil is discharged from the engagement oil chamber 35 of the forward clutch 16, so that the clutch pressure of the forward clutch 16 is maintained at "0" (symbol c1). In the sailing traveling mode, in which the engine 12 is stopped, the starter-generator 42 is also maintained at the stopped state (symbol d1). In addition, in the sailing traveling mode, an engine speed Ne, which is the rotational speed of the crank shaft 40, is "0" (symbol e1) and a primary speed Np, which is the rotational speed of the primary shaft 21, varies depending on the vehicle speed and gear ratio (symbol f1). Therefore, the rotational speed difference across the clutch is "N1".

Referring to time t2, when the solenoid 72 is switched to the non-energized state due to, for example, disconnection of the conduction line 105 (symbol a2), the clutch pressure control valve 70 is switched from the oil discharging state to the oil supplying state (symbol b2). Accordingly, supply of the hydraulic oil to the engagement oil chamber 35 of the forward clutch 16 is started, and the clutch pressure of the forward clutch 16 gradually increases (symbol c2). Referring to time t3, when it is detected that the solenoid 72 has been switched to the non-energized state (symbol a2), the starter-generator 42 is set to the powering state (symbol d2). Thus, the crank shaft 40 is rotated by the starter-generator 42, and the engine speed Ne is rapidly increased (symbol e2).

After that, referring to time t4, when the increasing clutch pressure of the forward clutch 16 reaches a predetermined value P1 (symbol c3), the forward clutch 16 is engaged while the engagement force is rapidly increased. Therefore, the rotational speed difference N2 across the forward clutch 16 is rapidly reduced (symbol e3). As described above, when the solenoid 72 is switched to the non-energized state, the starter-generator 42 is driven to increase the engine speed Ne. Accordingly, the rotational speed difference N2 across the clutch can be reduced before the forward clutch 16 is engaged, and the engagement shock of the forward clutch 16 can be reduced. As a result, as illustrated by the solid line Ga in FIG. 6, the amplitude of the acceleration in the front-rear direction of the vehicle 11 can be reduced, and the engagement of the forward clutch 16 due to disconnection, for example, can be dealt with without causing large discomfort to the occupant.

Referring to time t5 in FIG. 5, the starter-generator 42 is maintained in the powering state for a predetermined time, and then is set to the stopped state, in which output of the powering torque is stopped (symbol d3). When the solenoid 72 of the clutch pressure control valve 70 is in the non-energized state, it is difficult to disengage the forward clutch 16. Therefore, the traveling mode is switched to the engine traveling mode, and the sailing traveling mode is inhibited after that. When the starter-generator 42 is set to the powering state, the switch SW1 provided between the first power supply system 101 and the second power supply system 102 can be set to a disconnected state, that is, an OFF state. In such a case, the first power supply system 101 and the second power supply system 102 can be disconnected from each other, so that instant reduction in the voltage applied to, for example, the controller 81 does not easily occur even when power consumption of the starter-generator 42 is suddenly increased. Thus, the fail-safe control can be appropriately executed.

As described above, the vehicle control device 10 according to the embodiment of the disclosure increases the engine speed Ne by driving the starter-generator 42 to reduce the engagement shock of the forward clutch 16 due to, for example, disconnection. In contrast, referring to the dashed lines in FIG. 5, if the starter-generator 42 is maintained in the stopped state (symbol x1) and the engine speed Ne is maintained at "0" (symbol x2), the rotational speed difference N3 across the clutch is not reduced before the forward clutch 16 is engaged. Therefore, it is difficult to reduce the engagement shock of the forward clutch 16. In this case, as illustrated by the dashed line Gb in FIG. 6, the amplitude of the acceleration in the front-rear direction of the vehicle 11 is large and there is a risk that the engagement of the forward clutch 16 will cause great discomfort to the occupant. When the engine speed Ne is increased by driving the starter-generator 42 as described above, the engagement shock can be reduced so that the risk of causing discomfort, for example, can be reduced.

In addition, since the engine speed Ne is increased by driving the starter-generator 42, even when the forward clutch 16 is engaged due to, for example, disconnection, the risk of slipping of the driving chain 25 can be reduced, and the continuously variable transmission 13 can be protected. For example, when the forward clutch 16 is engaged in the sailing traveling mode, the primary pulley 22 that is being rotated becomes coupled to the engine 12 and the torque converter 15 that are stopped. Accordingly, the speed of the primary pulley 22 is rapidly reduced, which may cause slipping of the driving chain 25. However, since the crank shaft 40 and the torque converter 15 can be rotated by driving the starter-generator 42 before the engagement of the forward clutch 16, rapid reduction in the speed of the primary pulley 22 can be suppressed, and the risk of slipping of the driving chain 25 can be reduced.

The fail-safe control in the sailing traveling mode is realized simply by driving the starter-generator 42 when the solenoid 72 is switched to the non-energized state. Therefore, the engagement of the forward clutch 16 due to, for example, disconnection can be dealt with without a great increase in cost. For example, it is not necessary to reduce the risk of, for example, disconnection that causes the engagement of the forward clutch 16 by using a bus bar composed of a metal plate as the conduction line 105 or by controlling the clutch pressure control valve 70 with two systems. Therefore, the cost of the power train 14 is not greatly increased.

The disclosure is not limited to the above-described embodiment, and it goes without saying that various modifications are possible within the gist of the disclosure. For example, the vehicle to which the vehicle control device 10 is applied is not limited to the vehicle 11 including only the engine 12 as a power source, and may instead be a hybrid vehicle including both an engine and a driving motor as power sources. In addition, although disconnection of the conduction line 105 is described as abnormal energization of the solenoid 72 in the above-described embodiment, the abnormal energization is not limited to this, and may instead be any abnormal energization as long as the solenoid 72 is switched to the non-energized state. For example, the abnormal energization may be short-circuiting of the conduction line 105, disconnection or short-circuiting of a coil of the solenoid 72, or abnormality of the transmission controller 87 that controls energization of the solenoid 72. In addition, although the electric pump 55 driven by the pump motor 54 is used as the oil pump that supplies hydraulic oil in the sailing traveling mode in the above-described embodiment, any oil pump may be used as long as the oil pump is driven while the engine is stopped. For example, an oil pump driven by, for example, the primary shaft 21 that is rotated while the vehicle 11 is traveling may be used.

Although the forward clutch 16 is a friction clutch in the above-described embodiment, the forward clutch 16 is not limited to this, and may instead be a dog clutch. In addition, although the continuously variable transmission 13 is used as the transmission mechanism of the power train 14 in the above-described embodiment, the transmission mechanism is not limited to this, and may instead be a parallel shaft transmission mechanism or a planetary gear transmission mechanism. The engine traveling mode may be executed by engaging the forward clutch 16 after starting the engine 12 or by starting the engine 12 after engaging the forward clutch 16. The sailing traveling mode may be executed by disengaging the forward clutch 16 after stopping the engine 12 or by stopping the engine 12 after disengaging the forward clutch 16.

The main controller 81 illustrated in FIG. 4 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the main controller 81 including the first travel control unit 82, the second travel control unit 83, the traveling mode selector 84, the abnormality detector 85, and the fail-safe control unit 86. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the units illustrated in FIG. 4.

The invention claimed is:

1. A vehicle control device applicable to a vehicle comprising an engine, the vehicle control device comprising:
   an electric motor configured to be coupled to the engine;
   a hydraulic clutch configured to be disposed on a power transmission path between the engine and a wheel, the hydraulic clutch being configured to be set to an engaged state when hydraulic oil is supplied and to a disengaged state when the hydraulic oil is discharged;
   a solenoid control valve comprising a solenoid configured to be set to an energized state and a non-energized state, the solenoid control valve being configured to supply the hydraulic oil to the hydraulic clutch when the solenoid is in the non-energized state and discharge the hydraulic oil from the hydraulic clutch when the solenoid is in the energized state;
   a first travel control unit configured to execute an engine traveling mode in which the engine is set to a running state, the hydraulic clutch is set to the engaged state, and engine power is transmitted to the wheel;
   a second travel control unit configured to execute an inertial traveling mode in which the engine is set to a stopped state, the hydraulic clutch is set to the disengaged state, and the vehicle is moved by inertia; and a fail-safe control unit configured to drive the electric motor to increase an engine speed when, in a state in which the inertial traveling mode is executed, the solenoid is switched from the energized state to the non-energized state.

2. The vehicle control device according to claim 1, wherein the electric motor is a motor-generator configured to be coupled to a crank shaft of the engine by a belt mechanism.

3. The vehicle control device according to claim 2, further comprising:
an oil pump configured to supply the hydraulic oil to the solenoid control valve while the engine is in the stopped state.

4. The vehicle control device according to claim 3, further comprising:
a continuously variable transmission configured to be disposed on a power transmission path between the hydraulic clutch and the wheel.

5. The vehicle control device according to claim 2, further comprising:
a continuously variable transmission configured to be disposed on a power transmission path between the hydraulic clutch and the wheel.

6. The vehicle control device according to claim 1, further comprising:
an oil pump configured to supply the hydraulic oil to the solenoid control valve while the engine is in the stopped state.

7. The vehicle control device according to claim 6, further comprising:
a continuously variable transmission configured to be disposed on a power transmission path between the hydraulic clutch and the wheel.

8. The vehicle control device according to claim 1, further comprising:
a continuously variable transmission configured to be disposed on a power transmission path between the hydraulic clutch and the wheel.

9. A vehicle control device applicable to a vehicle comprising an engine, the vehicle control device comprising:
an electric motor configured to be coupled to the engine;
a hydraulic clutch configured to be disposed on a power transmission path between the engine and a wheel, the hydraulic clutch being configured to be set to an engaged state when hydraulic oil is supplied and to a disengaged state when the hydraulic oil is discharged;
a solenoid control valve comprising a solenoid configured to be set to an energized state and a non-energized state, the solenoid control valve being configured to supply the hydraulic oil to the hydraulic clutch when the solenoid is in the non-energized state and discharge the hydraulic oil from the hydraulic clutch when the solenoid is in the energized state; and
circuitry configured to
execute an engine traveling mode in which the engine is set to a running state, the hydraulic clutch is set to the engaged state, and engine power is transmitted to the wheel,
execute an inertial traveling mode in which the engine is set to a stopped state, the hydraulic clutch is set to the disengaged state, and the vehicle is moved by inertia, and
drive the electric motor to increase an engine speed when, in a state in which the inertial traveling mode is executed, the solenoid is switched from the energized state to the non-energized state.

* * * * *